United States Patent
Bitsch et al.

(10) Patent No.: US 9,599,093 B2
(45) Date of Patent: Mar. 21, 2017

(54) APPARATUS FOR AND METHOD OF MOUNTING WIND TURBINE BLADES ON A WIND TURBINE TOWER

(75) Inventors: Michael Lundgaard Bitsch, Langa (DK); Torben Friis Baun, Arhus N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 985 days.

(21) Appl. No.: 13/822,913

(22) PCT Filed: Sep. 14, 2011

(86) PCT No.: PCT/DK2011/050345
§ 371 (c)(1),
(2), (4) Date: May 28, 2013

(87) PCT Pub. No.: WO2012/034564
PCT Pub. Date: Mar. 22, 2012

(65) Prior Publication Data
US 2013/0236316 A1    Sep. 12, 2013

Related U.S. Application Data

(60) Provisional application No. 61/383,120, filed on Sep. 15, 2010.

(30) Foreign Application Priority Data

Sep. 15, 2010 (GB) .................. 1015433.4

(51) Int. Cl.
F03D 1/06 (2006.01)
F03D 1/00 (2006.01)

(52) U.S. Cl.
CPC .......... *F03D 1/0658* (2013.01); *F03D 1/001* (2013.01); *F05B 2230/608* (2013.01);
(Continued)

(58) Field of Classification Search
CPC .............................. F03D 1/001; F03D 1/0658
See application file for complete search history.

(56) References Cited

U.S. PATENT DOCUMENTS 5,140,856 A * 8/1992 Larsen ................ F03D 1/003
416/144
5,173,023 A * 12/1992 Pawlowski .......... F03D 1/0658
416/207

(Continued)

FOREIGN PATENT DOCUMENTS

EP    1882854 A2    1/2008
EP    2003333 A1    12/2008

(Continued)

OTHER PUBLICATIONS

Intellectual Property Office, Combined Search and Examination Report issued in corresponding GB Application No. GB1015433.4 dated Jan. 17, 2011, 6 pages.

(Continued)

*Primary Examiner* — Woody Lee, Jr.
(74) *Attorney, Agent, or Firm* — Wood Herron & Evans LLP

(57) ABSTRACT

The application describes an apparatus for and a method of mounting wind turbine blades on a wind turbine tower. A number of guide rods are provided in the vicinity of the blade root and hub for connection to corresponding socket sections. The guide rods and socket sections are provided on respective ones of a wind turbine blade and a wind turbine hub to facilitate connection of one to the other. The guide rods and the sockets may be provided on the same or on different ones of the blade or hub. The guide rods and sockets allow the blade to be positioned at the hub in the correct rotational orientation to facilitate connection of the necessary fasteners.

25 Claims, 16 Drawing Sheets

(52) U.S. Cl.
CPC ........... *Y02E 10/721* (2013.01); *Y02E 10/728* (2013.01); *Y02P 70/523* (2015.11); *Y10T 29/49321* (2015.01)

(56) References Cited

U.S. PATENT DOCUMENTS

| | | |
|---|---|---|
| 2006/0082135 A1 | 4/2006 | Askestad |
| 2010/0310379 A1 | 12/2010 | Livingston |
| 2012/0141280 A1* | 6/2012 | Holling ................... F03D 1/003 416/204 R |
| 2013/0036601 A1* | 2/2013 | Blanc ...................... F03D 3/064 29/596 |

FOREIGN PATENT DOCUMENTS

| | | |
|---|---|---|
| GB | 2436598 A | 10/2007 |
| WO | 2011050569 A1 | 5/2011 |

OTHER PUBLICATIONS

International Searching Authority, Search Report and Written Opinion issued in corresponding International Application No. PCT/DK2011/050345 dated Dec. 28, 2011, 12 pages.
International Bureau, International Preliminary Report on Patentability issued in corresponding International Application No. PCT/DK2011/050345 issued Mar. 19, 2013, 8 pages.

* cited by examiner

APPARATUS FOR AND METHOD OF MOUNTING WIND TURBINE BLADES ON A WIND TURBINE TOWER

The invention relates to an apparatus for and a method of mounting wind turbine blades on a wind turbine tower, and in particular for wind turbines that are intended for offshore environments.

FIG. 1 illustrates an off-shore horizontal axis wind turbine 1, comprising a wind turbine tower 2 on which a wind turbine nacelle 3 is mounted, and a rotor 4, comprising at least one wind turbine blade 5. The at least one wind turbine blade is mounted on a rotor hub 6 connected to the nacelle 3 through a low speed shaft (not shown) extending from the nacelle front. The wind turbine tower 2 is installed at an offshore location on a tower foundation 7, such as a monopile sunk into the sea floor. The wind turbine tower may have a platform arranged just above sea level for engineer access though this is not shown in the diagram.

Due to the cost of installing and maintaining wind turbines at sea, and the amount of available wind energy potentially available for capture at offshore sites, the dimensions of offshore wind turbines are typically as large as possible, for example rotor diameters of 100 to 150 m are not unusual. While installing large offshore wind turbines can maximise the return in terms of the income and the power generated by the turbine, large structures can be more difficult to install and repair than is the case for smaller, lighter models.

Construction of an offshore wind turbine would for example typically begin at on shore facilities where a large crane can easily be provided for lifting the wind turbine components into their assembled position. The crane may for example be required five or more lifting operations, one each for the tower and nacelle, and subsequently one for each of the three wind turbine blades. Once the wind turbine is assembled it is then transported by barge to the offshore installation location, where a crane on the transport barge lifts the tower into position onto the tower foundation 7.

Variations of this construction technique are possible, such as on shore assembly of only some of the wind turbine components, with the final assembly taking place at the offshore location by means of the barge crane. One technique is two attach two of the blades to the rotor hub of the nacelle in a rabbit ear configuration, and attach a single blade to the tower by means of a temporary fixing. At the offshore location, the nacelle and the tower are then connected to one another, and the blade attached to the tower is connected to the rotor hub at the correct position.

In many cases, the nacelle of the wind turbine is also provided with a crane for lifting components into position. Due to structural limitations arising from its position in the nacelle, the nacelle crane is typically not capable of lifting loads of the same magnitude as the barge or on-shore crane.

The nacelle or on tower crane can be used during construction of the offshore wind turbine, and also during maintenance operations. Occasionally during such operations, it is necessary to detach a wind turbine blade from the rotor hub, so that the blade or the hub can be inspected, and if necessary repaired. Means for temporarily attaching the wind turbine blade to the tower for maintenance are also known.

All of these construction techniques involve considerable overhead in terms of time and cost. Furthermore, detaching the wind turbine blade and reattaching it to the hub after a maintenance operation can be difficult. We have therefore appreciated that an improved method of constructing a wind turbine and installing it would be desirable, as well as an improved technique for detaching and attaching wind turbine blades to the hub.

BRIEF DESCRIPTION OF THE DRAWINGS

Examples of the invention will now be described by way of example and with reference to the drawings in which.

SUMMARY OF THE INVENTION

Figure 1:
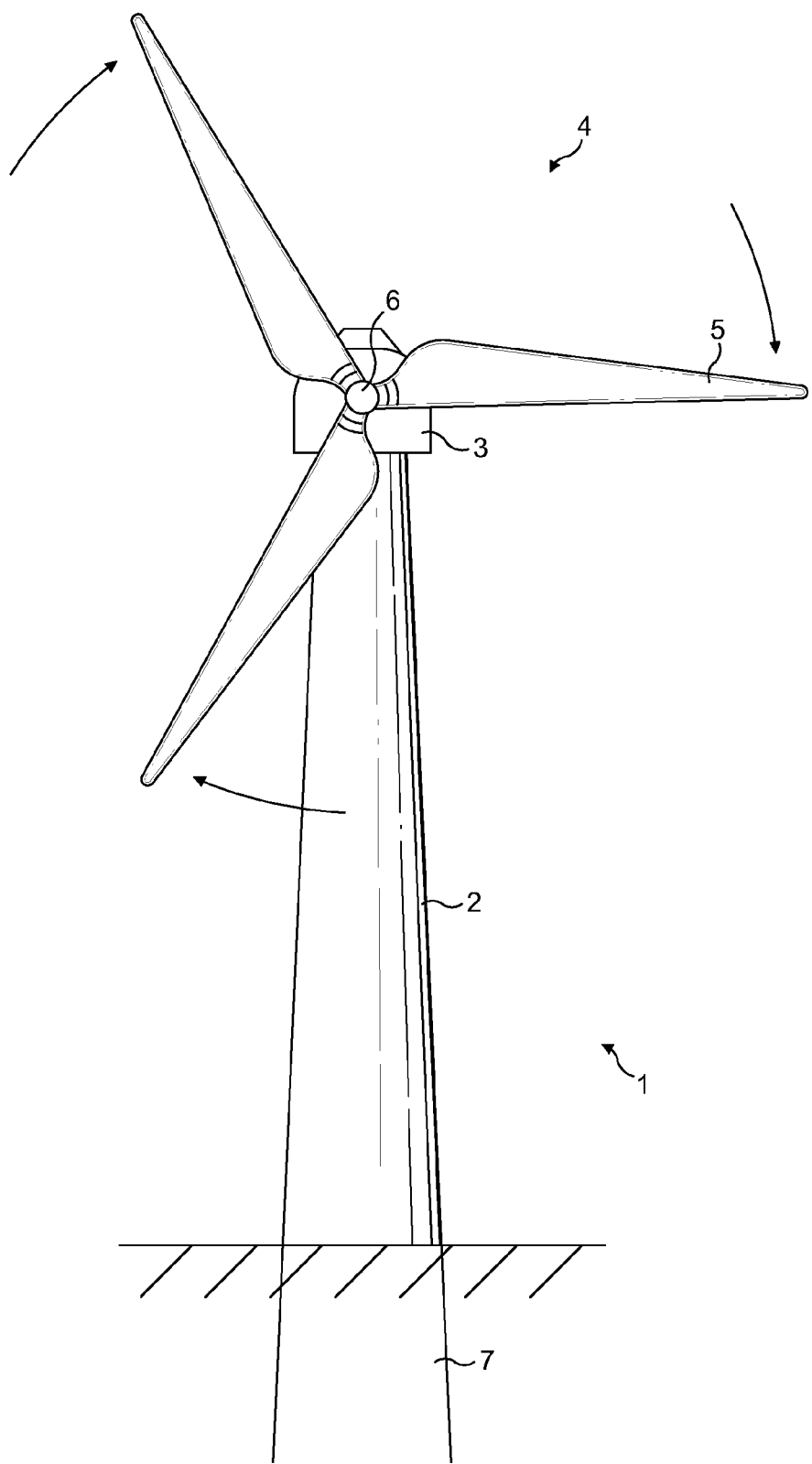
FIG. 1 is a schematic illustration of an offshore wind turbine.

The invention is defined in the independent claims to which reference should be made. Advantageous features are set forth in the appendent claims.

In a first aspect, the invention provides a blade connection apparatus for connecting a wind turbine blade to a wind turbine rotor hub, the connection apparatus comprising: a first and second engagement surface, wherein the first engagement surface is located at the root of the wind turbine blade and the second engagement surface is located on the wind turbine rotor hub for engaging with the first engagement surface; a plurality of fasteners for releasably and securely connecting the first engagement surface to the second, the fasteners comprising a male part provided on one of the engagement surfaces for connection with a corresponding female part provided on the other engagement surface; first and second guide members located on the wind turbine blade and the rotor hub respectively and arranged to cooperate as they are brought into contact with each other; wherein when the first and second engagement surfaces are brought towards one another for connection the first and second guide members engage one another in advance of contact between the first and second engagement surfaces, and ensure that the male and female parts of the fasteners are aligned for connection.

In this way, the fasteners can be inserted into their respective connection points holes without concern that they are not properly aligned and will be damaged.

The first and second engagement surfaces may be provided as substantially circular flanges having a circumference around which at discrete locations the plurality of fasteners are provided, in which case the cooperation between the first and second guide members as the first and second engagement surfaces are brought towards one another causes the circular flanges to undergo coaxial rotation with respect to one another so that the fasteners are properly aligned.

Furthermore, the first guide member is elongate in shape and extends from either one of the wind turbine blade or rotor hub towards the second guide member by an amount that is greater than the length of the male part of the fasteners. In this way, the guide member can more easily engage the socket in advance of the fastener.

In one embodiment, the first guide member is a pin secured to the rotor hub at a blade root bearing. The first guide member can also be tapered.

In one embodiment, one or the other of the rotor hub or the blade has at least an outer blade root bearing ring and an inner blade root bearing ring, and the first guide member is secured to the inner blade root bearing, and angled to extend towards the second guide member while remaining inside the circumference defined by the inner blade root bearing ring.

The second guide member can provides a recess for receiving the first guide member. The recess may comprise: an opening for receiving the first guide member in a partially inserted position; and tapered shoulders for supporting the first guide member in a fully inserted position.

In one embodiment, the tapered shoulders are curved to encourage the first guide member to take up a position in the centre of the recess.

The recess is provided in a guide member housing, the housing comprising: a lip portion for cooperating with the male fasteners on the first or second engagement surface; a cord for securing the lip portion and housing to the male part of the fasteners to and hold the housing in place. The guide member housing can then be detached by severing the cord once the blade has been attached to the hub.

The second guide member is located inside the circular flange of the blade root, or inside the circular flange of the blade connection portion on the hub.

In one embodiment, the connection apparatus comprises at least three first and second guide member pairs. By disposing these around the circumference of the blade root or hub, a rotational force can be provided to the blade so that it is rotationally aligned to connect correctly with the hub.

In a further embodiment, the invention provides a wind turbine blade and rotor hub connection guide system, comprising: first and second guide members for mounting on respective ones of a wind turbine blade or rotor hub, to facilitate connection of the wind turbine blade to the hub by fasteners having male and female fastener portions; wherein the first guide member has an elongate shape; and the second guide member provides a recess with an opening for receiving the first guide member in a partially inserted position, and a recess profile for supporting the first guide member in a fully inserted portion; wherein the recess profile encourages the first guide member towards a position in the recess, such that the wind turbine blade is correctly aligned for the attachment of the male fastener portions with the female fastener portions.

A corresponding method is also contemplated.

DETAILED DESCRIPTION OF THE PREFERRED EMBODIMENTS

The invention relates to an apparatus for and a method of mounting wind turbine blades on a wind turbine tower. A number of guide rods 94 are provided in the vicinity of the blade root and hub for connection to corresponding socket sections 96. The guide rods 94 and socket sections 96 are provided on respective ones of a wind turbine blade and a wind turbine hub to facilitate connection of one to the other. The guide rods 94 and the sockets 96 may be provide on the same or on different ones of the blade or hub. The guide rods and sockets allow the blade to be positioned at the hub in the correct rotational orientation to facilitate connection of the necessary fasteners. As the fasteners are often provided in advance partially connected to one of the hub or the blade, correctly ensuring alignment of the blade and hub before they are brought together prevents damage to the fasteners are installation.

Figure 2:
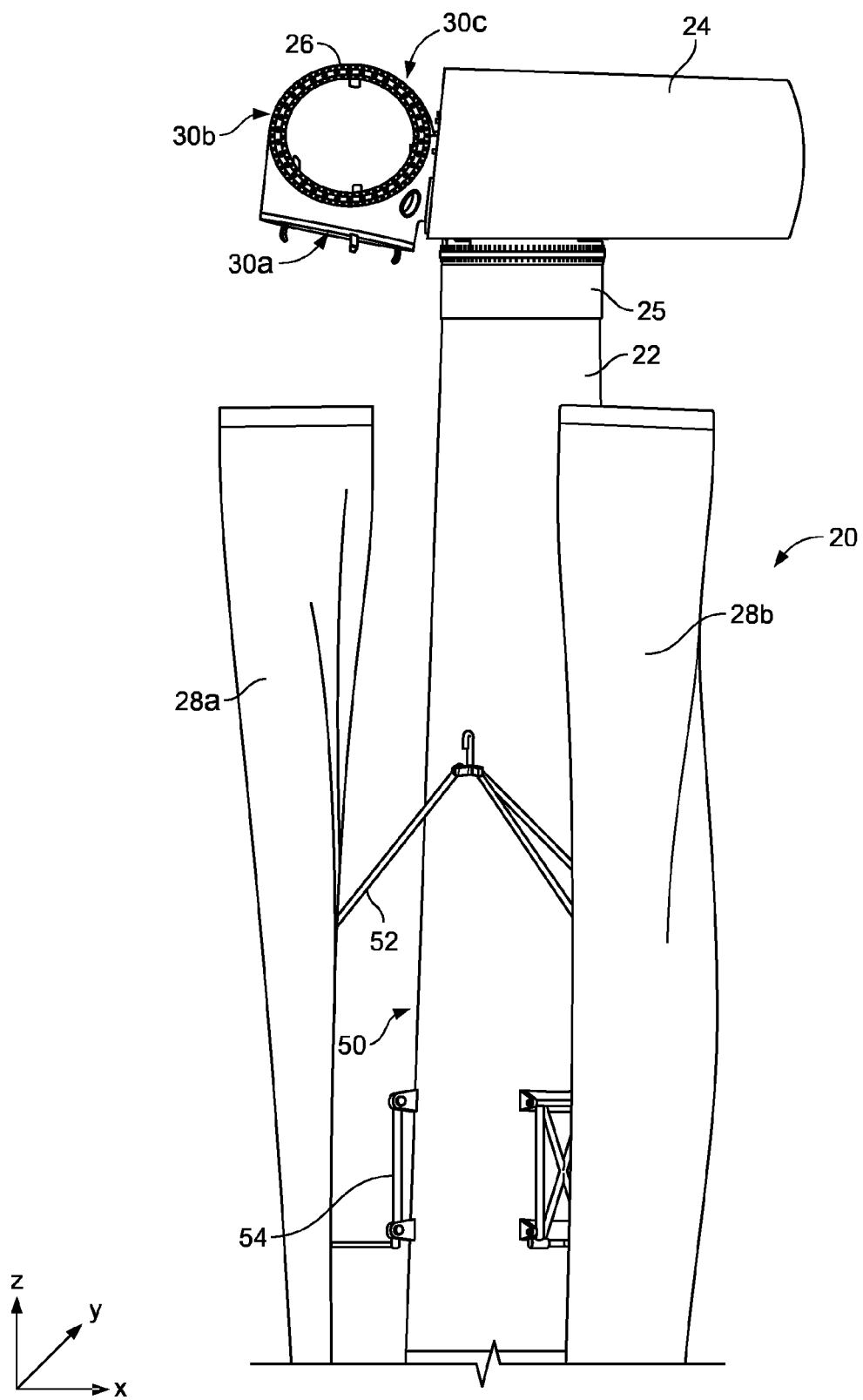
FIG. 2 is a schematic illustration according to a first example of an offshore wind turbine nacelle and upper tower section with attachment points for one or more wind turbine blades.
Figure 3:
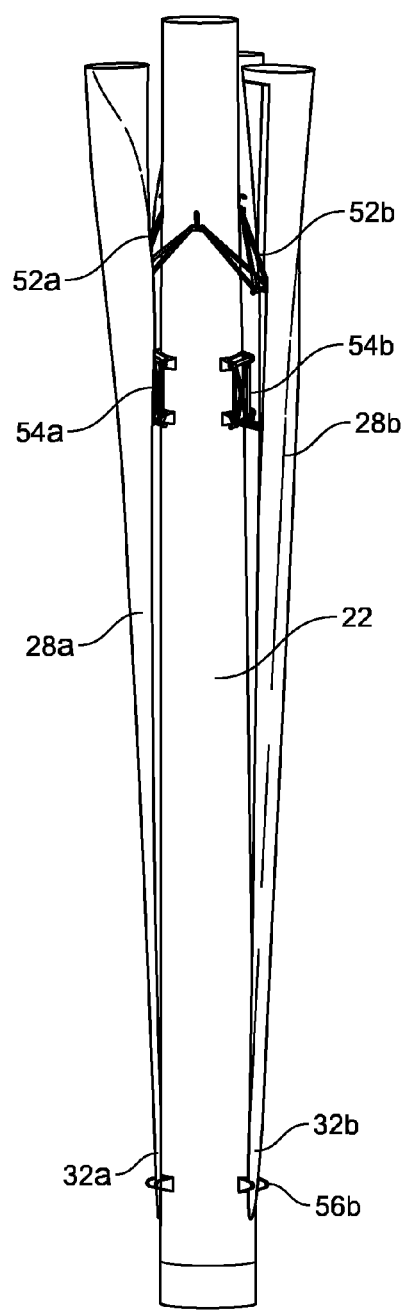
FIG. 3 is a schematic illustration according to a first example of the wind turbine of a longer section of the tower shown in FIG. 2, with attachment points for one or more wind turbine blades.
Figure 4:
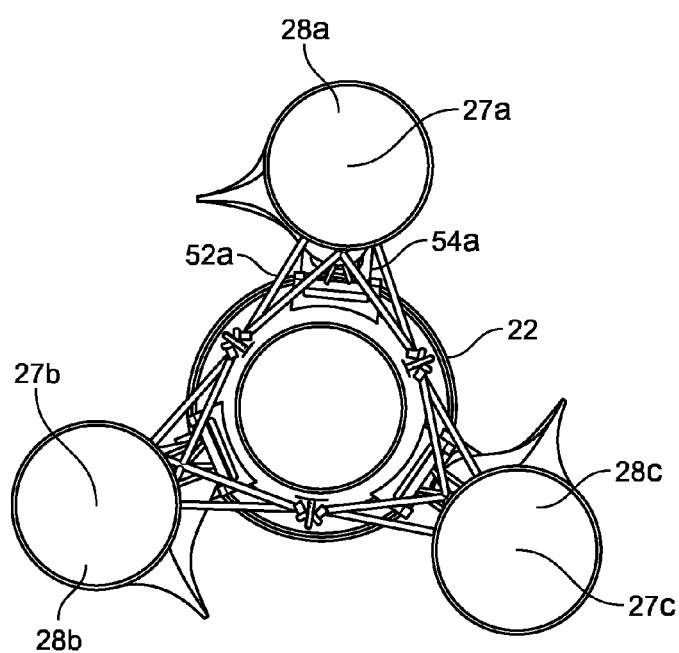
FIG. 4 is a top elevational view of the tower shown in FIGS. 2 and 4.

FIGS. 2, 3 and 4 illustrate a wind turbine 20 according to an example of the invention, in which the tower of the wind turbine is provided with guide arms for moving the wind turbine blades between an operating position in which they are connected to the rotor hub, and a stowed position in which they are detached from the rotor hub and stored against the wind turbine tower.

FIG. 2 is a side elevational view of the upper section of the wind turbine tower 22, having a nacelle 24 and rotor hub 26. The nacelle 24 can be mounted on the top of the tower 22 via a yaw drive 25, which allows the nacelle and the rotor hub 26 to be angled into or out of the direction of the prevailing wind.

The wind turbine 20 has three wind turbine blades 28a, 28b, and 28c, which in FIG. 2 are shown as detached from the rotor hub 26 and in their stowed position against the tower 22. In their stowed position, the blades 28 are supported in a substantially parallel relationship with the tower 22. It is not strictly parallel as it is convenient to have the blade tips secured against the blade tower 22 at a lower position. Although, the blades 28 are not themselves necessarily strictly straight it will be appreciated that it is convenient to speak about their orientation with respect to the longitudinal axis 27.

When the blades 28 are viewed in their stowed position, the rotor hub's blade root bearing assemblies 30a, 30b and 30c, at which the blades 28a, 28b and 28c can be mounted on the rotor hub 28, can be seen in more detail. It will be appreciated that the blade root bearing assemblies 30a, 30b and 30c, and therefore the blades in their attached position, are mounted on the rotor hub so that they are equally angularly spaced around the hub's axis of rotation. In the example of FIG. 2, assuming a vertical z axis, and right handed x and y axes arranged in the horizontal plane, the axis of rotation is along the x direction, and the first blade root bearing assembly 30a is shown facing in the negative z direction, with the second 30b and 30c assemblies shown as lying substantially along the y axis. This means that the blade root bearing assembly 30c is facing into the page and cannot be seen.

The blades 28a, 28b and 28c are each supported by an arm arrangement 50a, 50b and 50c, comprising an upper arm 52a, 52b and 52c and a lower arm 54a, 54b, and 54c. As shown in FIG. 3, the arm arrangements 50a, 50b and 50c are located towards the upper part of the tower 22, and the blade tips 32a and 32b are therefore also secured further down the length of the tower by blade tip rest sections 56a, 56b and 56c (not shown). The arm arrangements 50a, 50b and 50c, and the blade tip rest sections 56a, 56b and 56c are located at an equal angular separation around the circumference of the tower 22. FIG. 4 shows this arrangement in more detail as a cross-sectional view through the tower 22 and the three blades 28a, 28b and 28c. In this view, only the upper 52 and lower 54 arms can be seen. The arrangement of blades against the tower as shown in FIG. 4 can be advantageously used during transport of the tower 22 to the offshore installation location.

Figure 5:
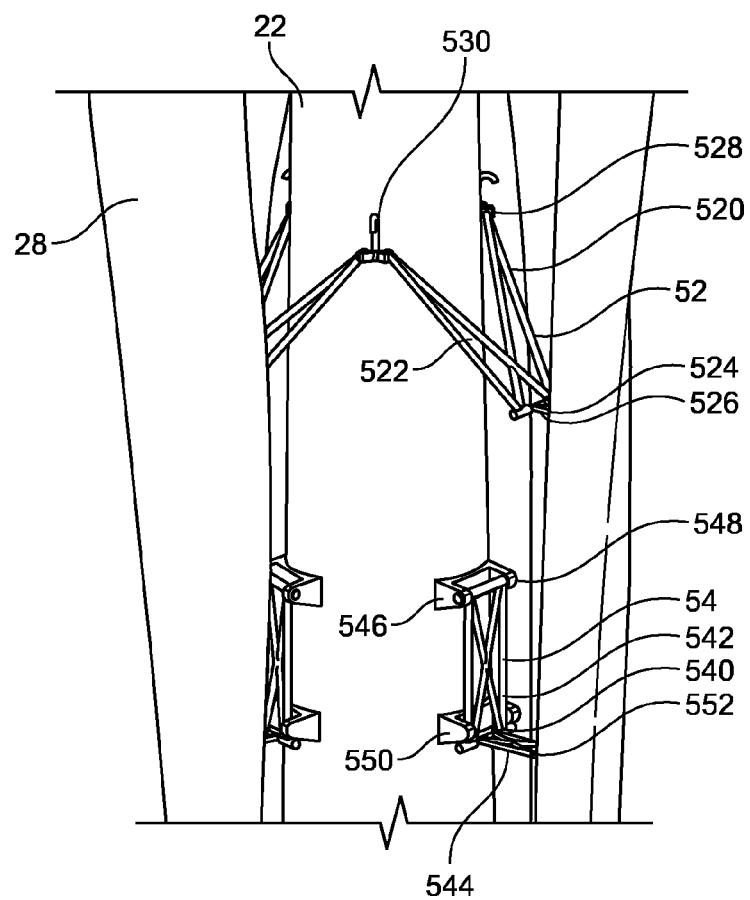
FIG. 5 is a close-up view of the attachment points for the wind turbine blades.

The structure of the upper 52a, 52b and 52c and lower 54a, 54b, and 54c arms is shown in more detail in FIG. 5 to which reference should now be made. For convenience in the following discussions the interaction of a single arm arrangement and its interaction with a single blade will now be described so that it will not be necessary to enumerate in each case the reference numeral suffixes a, b and c.

The upper arm 52 is substantially triangular or trellis-shaped, having opposing sides 520 and 522 meeting at a tip or apex 524. The tip of the triangular arm 52 is provided with a connector 526 for making a secure, releasable mechanical connection to the blade 28. This will be explained below in more detail.

As shown in FIG. 5, each opposing side 520 and 522 of the arm 52 is connected to the tower 22 by a pivot 528 and 530, allowing arm 52 to move between lower and upper positions. As will be appreciated from FIG. 5, the apex 524 of the arm 52 is actually provided as a rod and each of the opposing sides 520 and 522 are in fact composed of triangular frames, having a base in common with the rod forming the apex 524, and respective apex located at the pivots 528 and 530. The additional triangular shape of the opposing sides is adopted in this example as it forms a strong frame for the arm 52, which in use must be capable of bearing at least some of the weight of the blade. The base of the triangle or trellis shape is omitted to accommodate the curve of the tower 22.

As shown in FIG. 5, the lower arm 54 has a different construction to the upper arm 52, most notably in that it is an articulated arm having an intermediate joint or elbow 540. In this example, the lower arm 54 is also not triangular, but instead comprises first and second rectangular frame sections 542 and 544 connected to one another at the joint 540. The first frame section 542 is connected to the tower 22 at a hinge 546 that allows it lie substantially downwards against the tower 22 when the arm is stowed. For this reason, the hinge 546 is supported on a bushing 548 so that the hinge is supported slightly away from the tower, and the curvature of the tower will not prevent the first frame section 542 from hanging vertically downwards.

A second bushing 550 is provided on the tower 22 below the first, for receiving the other end of the first frame section 542 and for stably supporting the frame section in a rest position, when the blades 28 are stowed. The first frame section 542 extends slightly below the second bushing 550 so that the joint 540 provided on the end of the first frame section 542 can move unhindered.

The second frame section 544 connects to the first via the joint 540 and is arranged to pivot in the same direction as the first frame section 542. The movement of the second frame section about the joint 540 can be limited, so that the angle between the first and the second frame section is not more than 180°. In this way the lower arm 54 and the movement of the first and second frame sections around the joint or elbow 540 is similar to the articulated movement of the human arm. In the stowed position of the blade, the first frame section 542 of the lower arm 52 hangs downwards, while the second frame section 544 extends from the tower at an angle of about 90° to the first frame section 542.

The connection between the second frame section 544 and the wind turbine blade 28 can be made in the same way as for the upper arm 52, using a connector 552 (which may be the same construction as 526 above). This will now be described in more detail.

The connection between the upper 52 and lower 54 arms and the wind turbine blades 28 can be made by any suitable mechanical connection. It will be appreciated however that any connection must be capable of supporting the weight of the blades 28 and be easy to attach and detach in operation. Furthermore, the presence of a connection location must not unduly affect the aerodynamic properties of the blade when it is in use on the rotor hub.

This is achieved by providing compartments in the wind turbine blade surface for receiving the connector apparatus 526 and 552 of each arm 52 and 54. The blade compartments have a cover that can be opened to accommodate the connector apparatus, or closed when the blades are in use to ensure a smooth aerodynamic surface for the blade. The compartment cover can therefore be operated using an electrical circuit or optical signalling system allowing remote control.

In this example, the compartments comprise a corresponding mating connector for the connector apparatus 526 and 552 so that a strong, secure connection can be formed. The corresponding mating connectors are preferably attached to a supporting structure within the blade, such as the main spar, or alternatively pass through the blade to join with a corresponding pairwise connector on the opposition blade surface.

Figure 6:
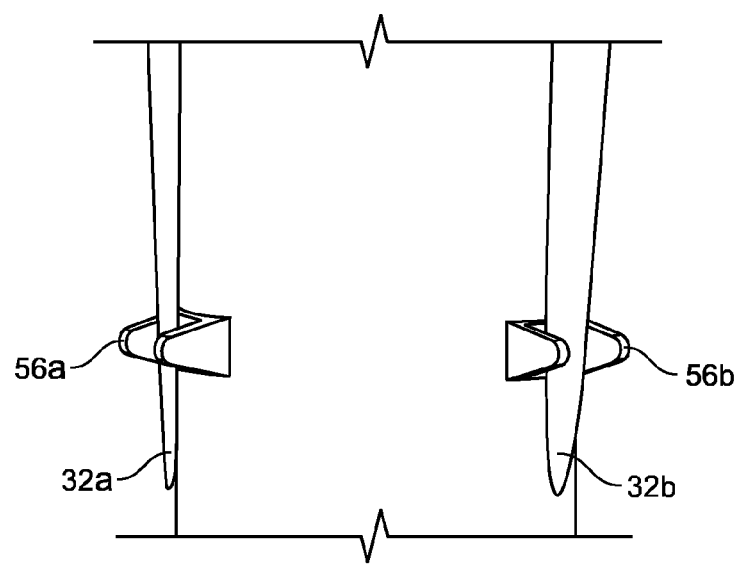
FIG. 6 is a close-up view of the attachment points for the tips of the wind turbine blades.

Suitable connector apparatus are known, and are described in US2007/0258823 for example, in the name of the applicant The blade tip rest sections 56 will now be discussed in more detail and with reference to FIG. 6. Unlike the arm arrangements 50, the blade tip rest sections 56 are not required to bear much, if any, of the weight of the blades 28. In this way, the blade tip rest sections 56 can, in one embodiment, simply be provided with shoulders or lateral supports for receiving the blade tip and restricting any sideways motion that may occur as wind induced stresses and strains can cause the blade to deform or twist. In alternative embodiments, connection means for attaching the blade tip 32 to the blade tip rest section 56 could be provided so that the connection is more secure. The connection means can include the connector apparatus used for the arms above, or other connector apparatus such as a magnetic band, or cable to secure the tip in place.

A further embodiment for the blade tip rest section 56 comprises an inflatable member for attachment to the blade tip and to the tower. A suitable inflatable member is an inflatable ring that can be threaded over the end of the wind turbine blade. It is advantageous if the inflatable member is releasably detachable from the wind turbine tower, so that when it is needed it can be released from the tower and threaded over the detached wind turbine blade. As the blade is lowered into its stowed position by means of the upper and lower arms, the inflatable member can be reattached to the tower to hold the blade tip in place. The connection between the inflatable member and the tower can be a via a secure cable, cord or bolt that is passed through a reinforced wall section of the member and a suitable mating point on the tower. Preferably, the connection can be released remotely so that an engineer in the nacelle can release the connection without having to climb down to the tower position where the inflatable member is located. A magnetic or electro magnetic connection is particularly useful in this regard, If desired, the inflatable member may be deflated once removed from the tower so that it can be fitted over the blade tip more easily, and subsequently reinflated.

The inflatable member can any suitable shape for cushioning and supporting the blade tip when the blade is in the stowed position. In particular, it may be an annular ring, or a disc or other solid shape with a cut out for receiving the blade tip. The cut out may also be shaped so that its profile matches the tip more closely.

In an alternative embodiment, the inflatable member could be C-shaped, or any profile in which a wider internal cut-out for receiving the blade tip is accessed by a narrower opening portion through which the blade tip must first pass to reach the internal cut out. This inflatable member need not be detached from the tower during use, but could instead remain inflated or partially inflated to receive the tip when the blade is moved into the stowed position by the support arms.

Longitudinal inflatable members located on either side of the rest position of the blade tip in the stowed position could also be used to bolster the blade and prevent lateral movement.

We have appreciated that the positioning of the upper 52 and lower 54 arms when they are connected to the wind turbine blades 28 is of considerable importance, as with careful consideration the arms can be used not only to support the blades in their stowed position, but also to act as guides for facilitating connection of the blades 28 to the rotor hub 26.

Figure 7:
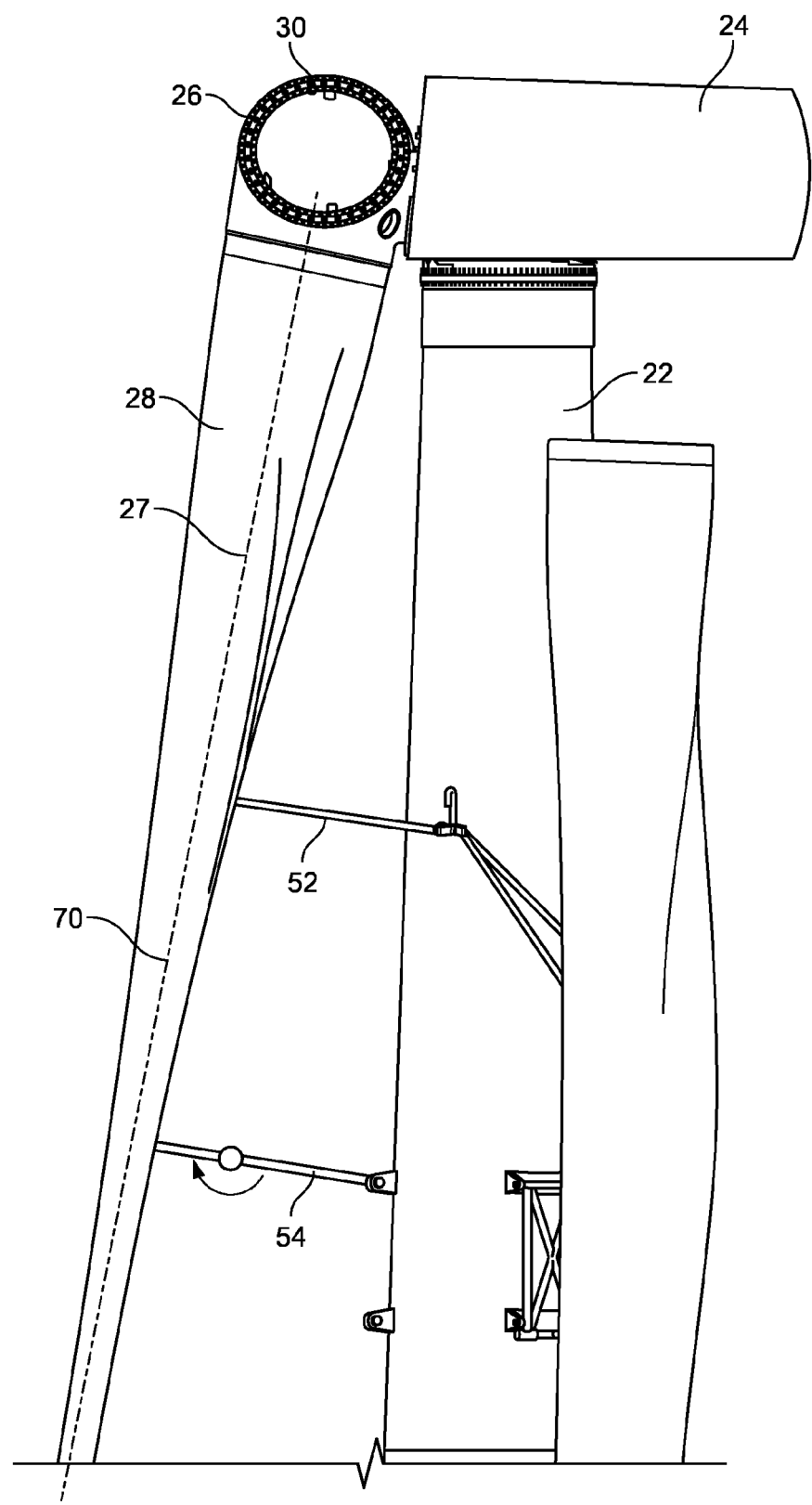
FIG. 7 is a schematic illustration showing the positioning of the blade guide arms.

Referring now to FIG. 7, the connection points for the connector apparatus 526 and 552 of the arms on the blades 28 are positioned with respect to the blades centre of gravity. In FIG. 7, the centre of gravity of the blade is illustrated schematically as CoG position 70. In this example the connection positions for the upper and lower arms are located equidistant from the CoG position 70, as this distributes the loading due to the weight of the blade substantially equally on the upper and lower arms, and means that the handling of the blade 28 when it is being attached or detached from the arms is more stable. It will be appreciated that if one of the arms is further away from the CoG position 70 than the other, the blade could pivot around one of the arms during handling.

The lengths of the upper 52 and lower 54 arms are also selected to assist in stable handling of the blade during connection and disconnection of the blade to the rotor hub 26. First, in order to enable the mounting of the blade 28 on the rotor hub 26 to be as straight as possible, the arms are arranged to be substantially perpendicular to the longitudinal axis 27 of the blade 28 at their connection point when the arms are fully extended from the tower 22.

The fully extended lower arm 54 in which the first and second frame sections 542 and 544 lie along a straight line, is longer than the upper arm 52, so that the blade tip 32 is angled further away from the tower 22 than the blade root. This ensures that the blade 28 is close to the operating orientation it will adopt when attached to the blade root bearing assembly 30 which both facilitates the connection of the blade 28 to the blade root bearing assembly, and makes the handling of the blade 28 in intermediate positions more stable. As shown in FIG. 7, the upper and lower arms 52 and 54 when fully extended are arranged to support the blade 28 so that its longitudinal axis (indicated as dashed line 27 in FIG. 7) is aligned with the centre of the blade root bearing assembly and so that the blade root edge lies approximately parallel to the blade root bearing to facilitate attachment.

When detaching the blades 28 from the blade root bearing, and so that the blade 28 can be rotated into the stowed position where it is substantially parallel with the tower, the upper arm 52 of this arrangement must extend from the tower 22 by a larger amount than the lower arm 54, when the arms are fully retracted. This is achieved by constructing the second arm as jointed first 542 and second 544 frame sections that pivot at elbow 540. Thus, in its fully retracted position, the lower arm, 54 extends from the tower substantially only by the length of the second frame section 544.

In this example, although the connection positions are arranged equidistant from the CoG position 70, in alternative embodiments the position of the arms may be adjusted to give the blade 28 a rotational bias when it is suspended on the arms 52 and 54.

The procedure for attaching a blade 28 to the rotor blade hub 30 using the apparatus discussed above will now be described with reference to FIGS. 8 to 11.

Figure 8:
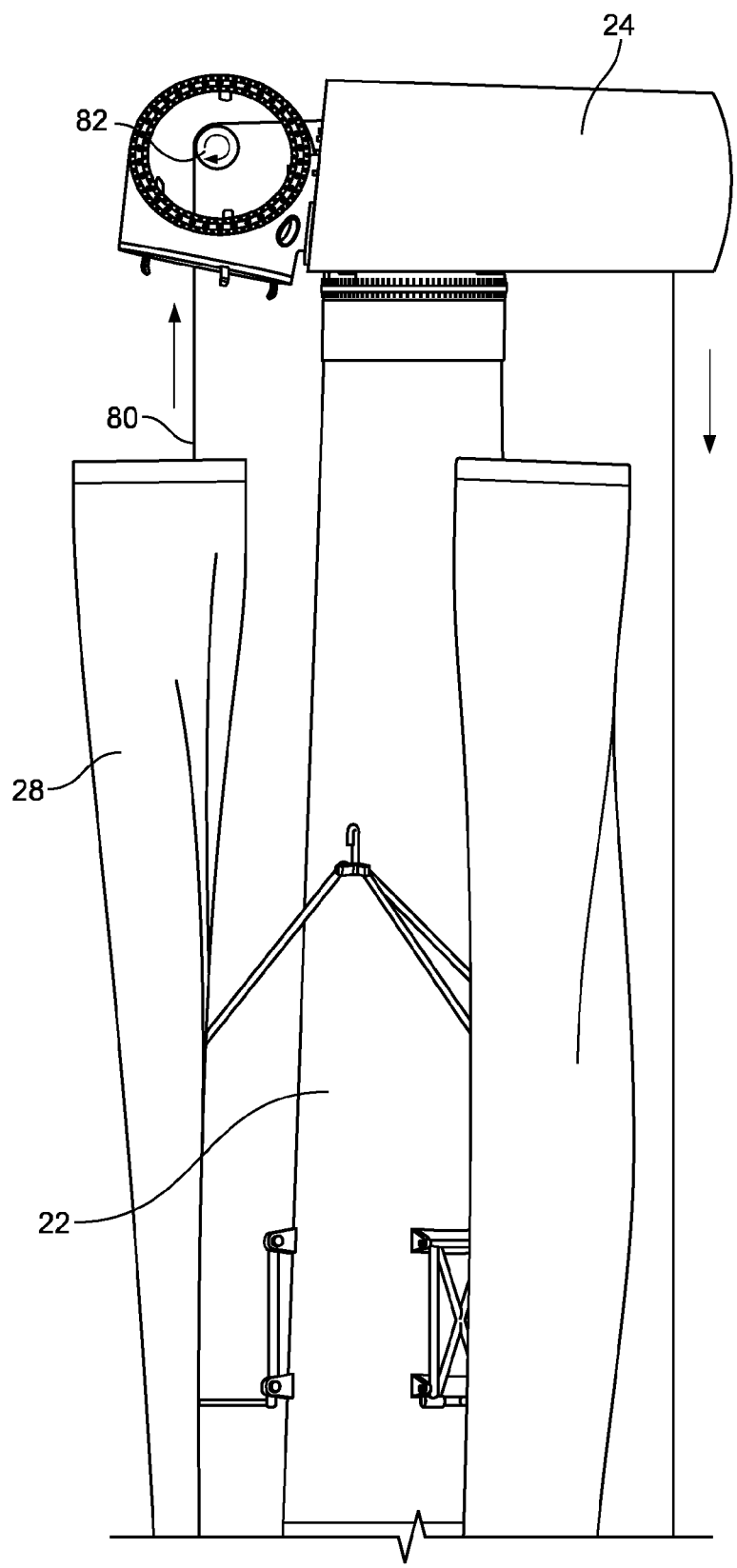
FIG. 8 is a schematic illustration showing a method for attaching a blade to the rotor hub, wherein the blade is in a starting position.

FIG. 8 illustrates a starting position, in which the blade 28 is in its stowed position against the tower. In this position, the upper arm 52 extends from the tower 22 at an acute angle, and the second frame section 544 extends from the tower perpendicularly, while being supported on the bushing 550. The first frame section 542 of the lower arm 54 is parallel to the tower 22.

A cable 80 is connected to a suitable point on the blade 28, such as at the blade root, and suspended from a winch or pulley 82 provided in or on the hub 26. The cable 80 passes over the winch or pulley 82. In FIG. 8, the winch or pulley 82 is shown inside the hub 26, although it may be installed at other locations, such as on the front or on the top of the hub 26. The illustrated position is preferred as it makes maintaining the alignment of the blade 28 with the blade root bearing assembly more straightforward.

In embodiments where a winch is used, a motor (not shown) provides the motive power to the winch 82 to support the blade 28 when detached from the blade root bearing assembly, and lift the blade towards the hub 26. Where a pulley 82 is used, the pulley merely provides a pivot for the cable 80, and the cable is then fed back into the nacelle 24 where a motor or winch can be more easily located. It is not necessary to use a winch, and a counterweight could be used instead. In the example shown in FIG. 8 for example, the cable is fed through the nacelle 24, over a pivot 84 at the nacelle rear, and downwards to a blade counterweight (not shown). A number of different arrangements are possible for the winch or pulley 82, and will be apparent to the skilled person. In particular, the winch may be located inside the rotor hub for ease of access by an engineer, or outside the hub, which position is preferred for the resulting orientation of the blade. The motor could be located in the nacelle of the wind turbine generator, or at another location in the tower, including the interior or exterior at the base of the tower.

The cable 80 may or may not provide the entirety of the lifting force to raise the wind turbine blade, and the arms 52 and 54 themselves can advantageously comprise electric or hydraulic drive means for moving them between their extended and stowed positions while bearing the wind turbine blade. A control system located in the wind turbine, such as in the nacelle or tower can be used to operate the arms as desired. Advantageously, the tower provides an access hatch for a service engineer to access the arm hinges and carry out maintenance if desired. In one embodiment, the arms 52 and 54 could provide the entirety of the force required to bear the weight of the wind turbine blade, with the cable 80 being used as an additional guide.

Figure 9:
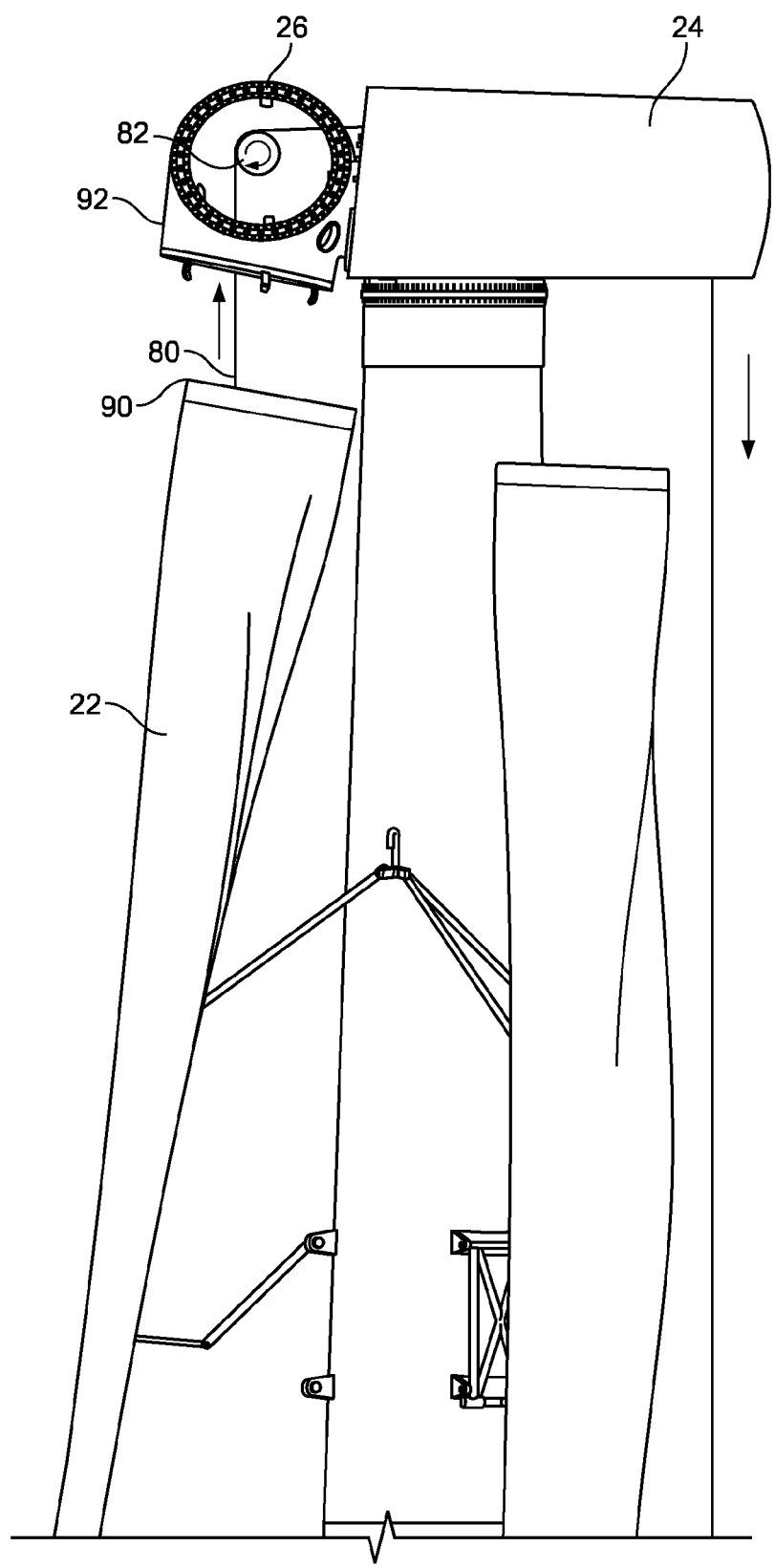
FIG. 9 is a schematic illustration showing a method for attaching a blade to the rotor hub, wherein the blade is in a second position.

In FIG. 9, the winch 82 pulls on the cable 80 to raise the blade 28 towards the blade root 30. As the blade 28 rises upwards, the upper 52 and lower 54 arms are also pulled upwards and so begin to extend further from the tower 22. As noted above, the arms 52 and 54 may also provide a force to lift the blade into position, allowing the cable 8o to perform more of a guide function in positioning the blade on the hub.

Figure 10:
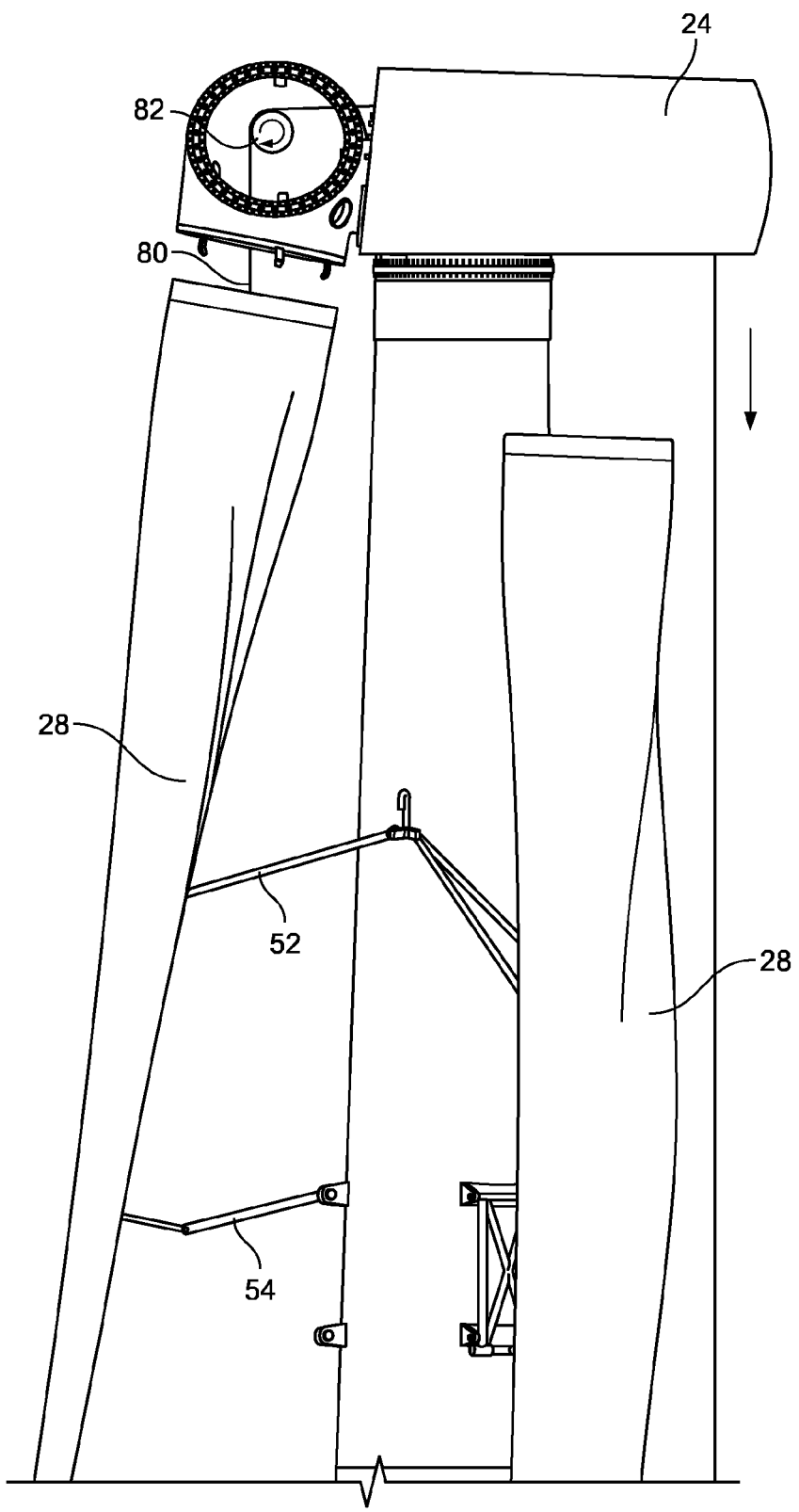
FIG. 10 is a schematic illustration showing a method for attaching a blade to the rotor hub, wherein the blade is in a third position.
Figure 11:
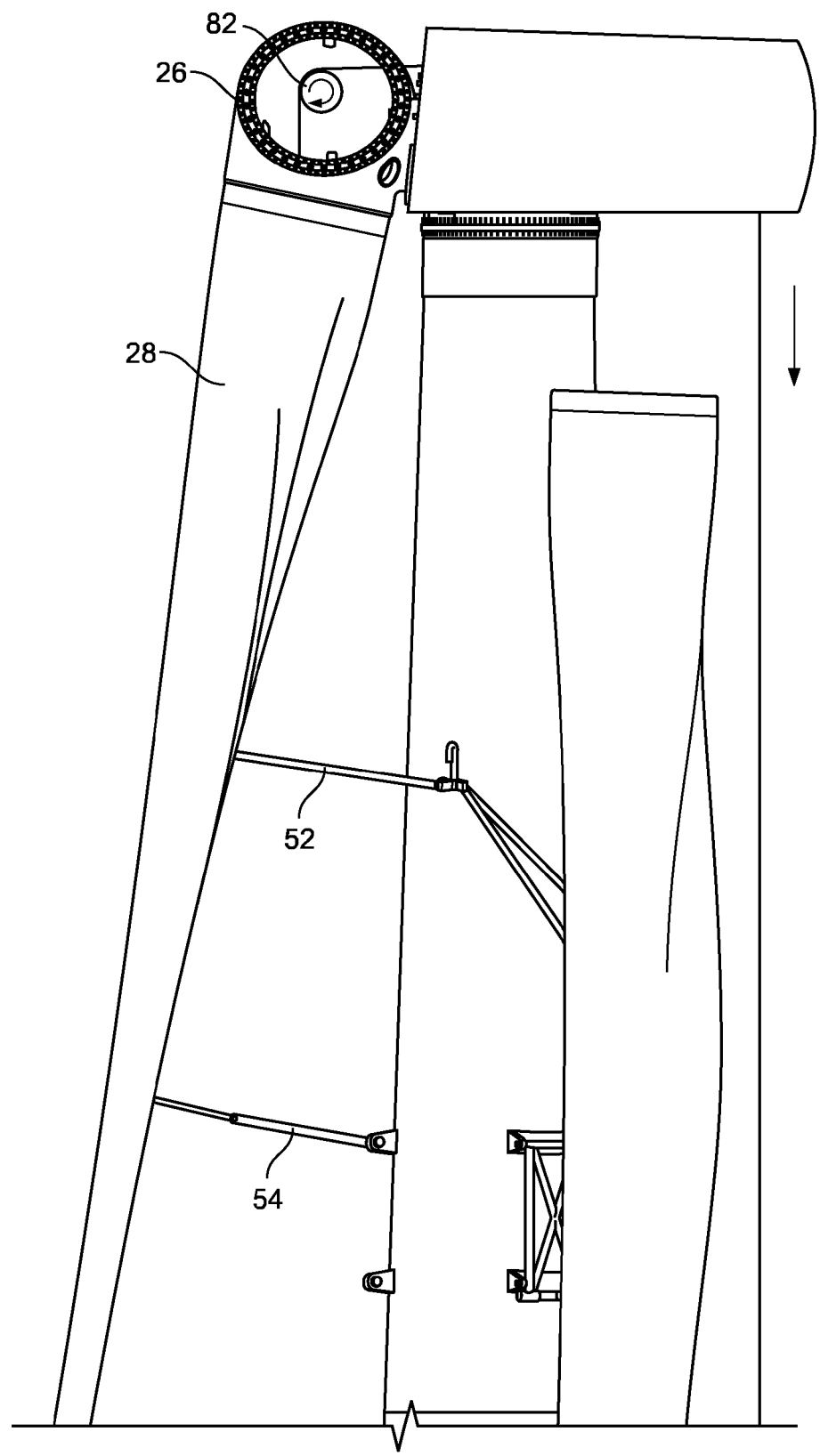
FIG. 11 is a schematic illustration showing a method for attaching a blade to the rotor hub, wherein the blade is in a final position.

In FIG. 10, the blade 28 is shown closer to the blade root bearing assembly and the arms are more fully extended. As the arms extend, they support the blade 28 away from the tower and therefore angle the blade 28 so that the rim of the blade root on the blade is aligned with the rim of the blade root bearing assembly on the hub 26.

As the winch 82 continues to pull the blade 28 towards the hub 26, the blade 28 finally reaches a position where the rim 90 of the blade root engages with the rim 92 of the blade root bearing. In this position, the upper 52 and lower 54 arms are fully extended and hold the blade 28 stably in position at the blade root bearing. In this position, a service engineer in the hub 26 can make the necessary mechanical connections to fix the blade 28 in place, while the blade is supported. FIGS. 8 to 11 further illustrate apparatus attached to the blade root bearing assembly (and visible on the rim 92) which cooperates with complementary apparatus inside the blade root and ensures that the blade 28 is positioned correctly when it is received at the hub 28. This will be described later with reference to FIGS. 14 to 18.

Once the blade 28 is secured in position against the rotor hub 26 blade root bearing assembly, the arms 52 and 54 are detached from the blade 28 and are lowered into a stowed position against the tower. For this reason, the arms are also advantageously provided with a control system that enables the connection with the blades 28 to be broken, and the arms to be moved between their fully extended position and fully stowed position. In embodiments where the arms 52 and 54 are not powered, then the cable 80 can be used to lower the arms safely into their stowed position.

Once a blade 28 is attached, the nacelle 24 can be rotated so that the hub 26 is now located directly above the next blade 28 for attachment. The hub 26 is the rotated so that the blade root bearing is facing the next stowed blade 28 and the process illustrated in FIGS. 8 to 11 is repeated.

Detaching blades involves a similar process. The hub 26 is rotated into a position in which one of the blades 28 is hanging directly downwards, and the nacelle 24 is rotated so that the blade 28 is lined up with an available arms arrangement 50 on the tower 22. The arms 52 and 54 are then brought into in their extended position where they can engage with the rotor blade 28, while the cable 80 is attached to a suitable connection point in the blade, such as at the root of the rotor blade. Either the arms or the cable or both then support the weight of the blade as it is detached from the hub 26.

Connecting the arms 52 and 54 to the one or more connection points on the rotor blade can be achieved in a number of ways. In one embodiment, the arms 52 and 54 are powered and can be activated from the nacelle by a service engineer. Providing the rotor blade is angled downwards, towards the six o'clock position the arms can be activated so that they move from their stowed position into a position ready to engage with the rotor blade. The connection points are located on the blades at positions that correspond to the positions adopted by the arms when they are activated. So, once the blade is in the six o'clock position, the service engineer knows that the arm connector apparatus 526 and 552 are located close to the appropriate connector mating connections in the blade. The service engineer can then activate the arms to engage the blade and make the connection.

In one example, the compartments in the blade are tapered, having a large opening near the blade surface and narrowing as they extend into the blade interior. The large opening provides tolerance for the connector apparatus 526 and 552 on the arms 52 and 54 to be received in the blade in the vicinity of the mating connectors, without there being an initial need for perfect alignment of the connecting parts. In normal usage, the opening of the tapered compartment is covered by the blade outer shell.

Once the connector apparatus is located inside the tapering compartment, the tapering portion guides the connector apparatus 526 and 552 to the mating connectors internal to the blade. During this process, the blade may naturally move slightly under action of the arms 52 and 54 in order to accommodate the connector apparatus 526 and 552. The connector mating apparatus in the blade may therefore comprise a latch mechanism, so that once the connector apparatus has adopted the correct position to engage, it is latched in place. Such a latch may be engaged mechanically or electrically. It is preferable, if the latch is releasable electronically, so that the release operation can be carried out remotely.

The compartment need not solely be tapered in order to guide the connector apparatus 526 and 552 towards the corresponding mating connector, and other shapes such as narrowing curves or stepped surfaces could also be used.

If desired, the connector apparatus 526 and 552 provided on each arm 52 and 54 can be carried on a moveable bearing, operable remotely by the service engineer in the nacelle or in the tower and permitting some degree of motion of the connector apparatus 526 and 552 with the arms 52 and 54. This allows the service engineer to guide the connector apparatus towards the blade using the coarse movement of arms 52 and 54, and the finer movement of the moveable bearings.

The blade 28 is then detached from the blade root bearing assembly so that its weight is borne on the cable 80 and, to a lesser extent, the arms 52 and 54. The cable 80 is then slowly let out on the winch 82 and the blade 28 is lowered towards its stowed position. The arms 52 and 42 gradually fold towards the tower and are locked into place by a mechanical or electrical system once the blades are fully lowered.

The apparatus described above can also be used in maintenance operations, such as where work is to be carried out on the blade root or blade connection ring on the hub. One particular maintenance operation that could be carried out is for example the replacement of the blade bearing ring from its attachment position at the blade root. In this case, while the blade is supported on the arms either in the extended position or in their stowed position, the blade bearing ring can be repaired or detached from the blade and replaced. If this operation is carried out in the extended position then it can be useful if the arms can be locked into position to provided additional support. Otherwise, the blade can simply be supported on the cable, or by the powered arms.

Figures 12, 13:
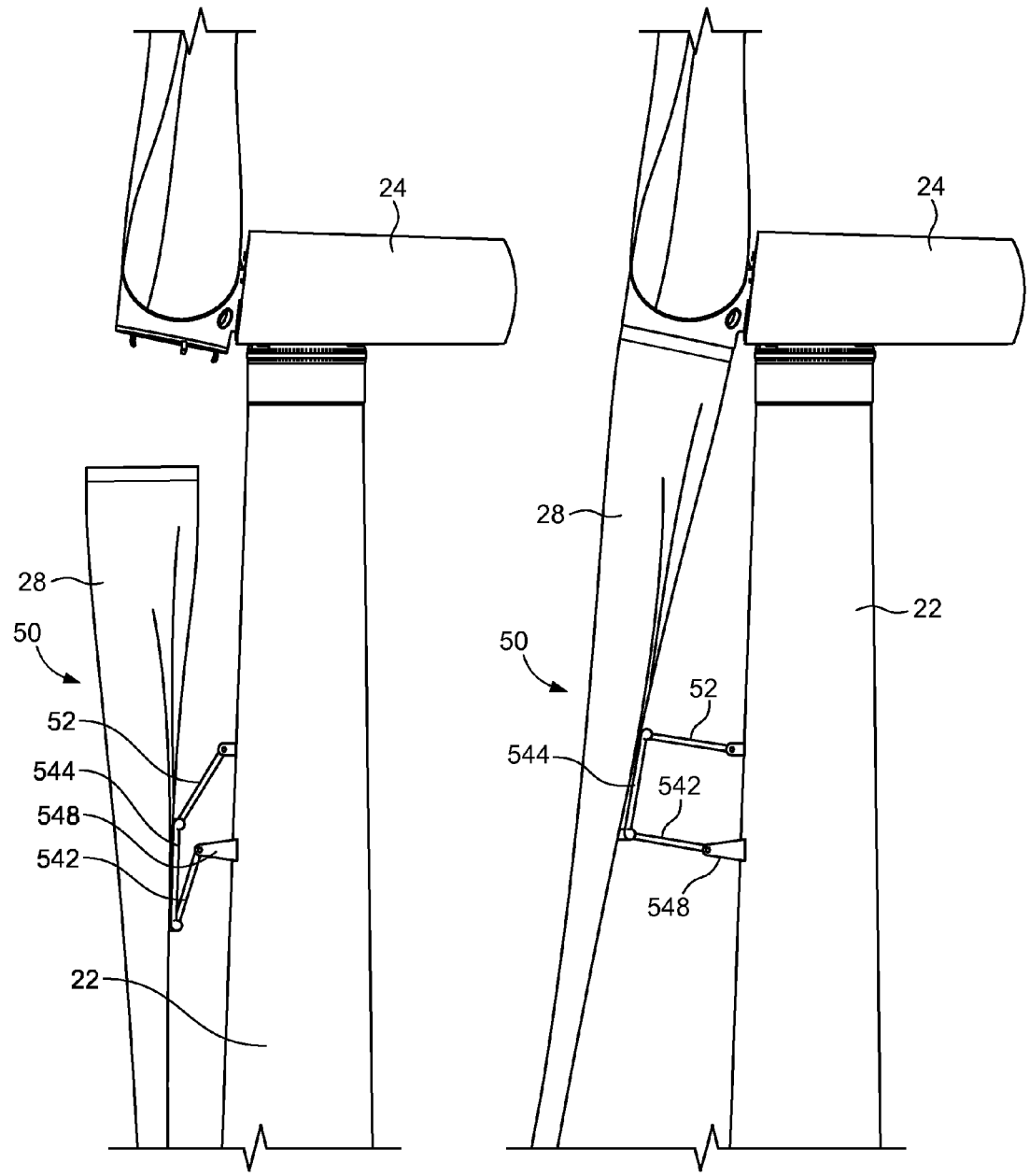
FIG. 12 is a schematic illustration of an alternative embodiment of blade guide arms in a starting position.
FIG. 13 is a schematic illustration of an alternative embodiment of blade guide arms in a final position.

In the example described above, the upper 52 and lower 54 arms mostly provided support for the blade 28, which was pulled towards the hub 26 by the winch 82. In alternative examples, the winch 82 may be disposed, and the arms themselves used to provide the motive power for detaching and attaching the blades. Such an example will now be described with reference to FIGS. 12 and 13.

As before, an arm arrangement 50 is provided on the tower 22 for supporting the blades 28, comprising an upper 52 and a lower arm 54. The arms in this example are provided with a hydraulic or electric power system for bearing raising weight of the blade 28. Further, the hinging of the arms is adapted slightly.

The lower arm 54 is mounted on a bushing 548 slightly away from the tower 22, and comprises first 542 and second sections 544, the first section pivoting about the bushing 548 and the second section 544 pivoting around the first 542. When connected to the blade 28, the second section 544 of the arm 54 lies along the blade edge, thereby providing an increased support for the weight of the blade. Preferably, the second section 544 extends along the blade 28 and joins the location at which the upper arm 52 is connected to the blade.

Figure 14:
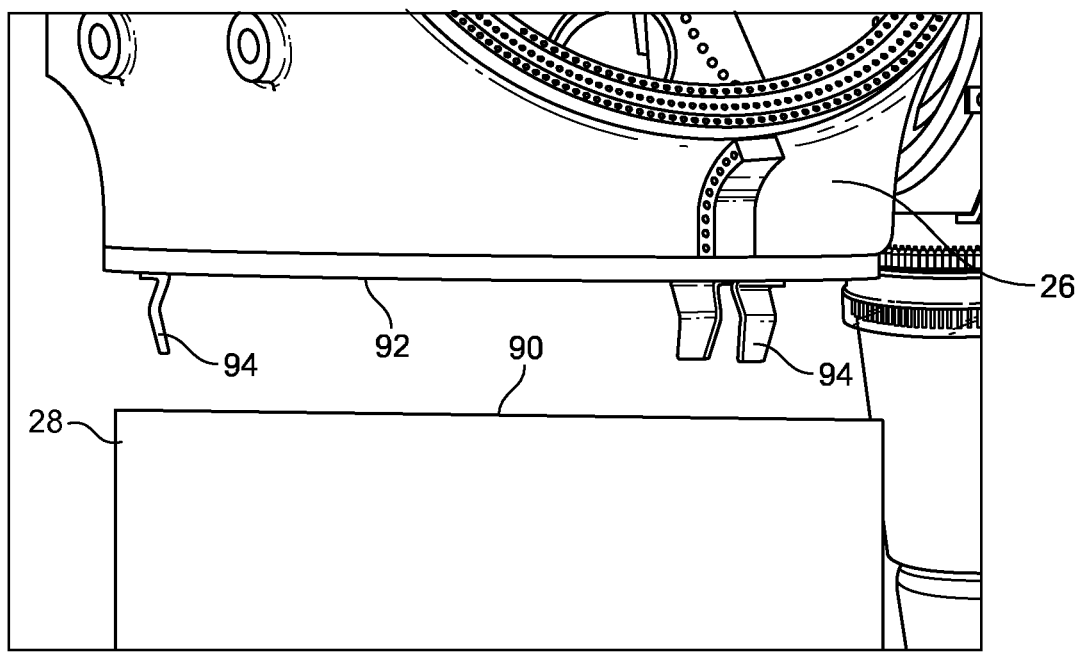
FIG. 14 is a schematic illustration of blade attachment guide rods.
Figure 15:
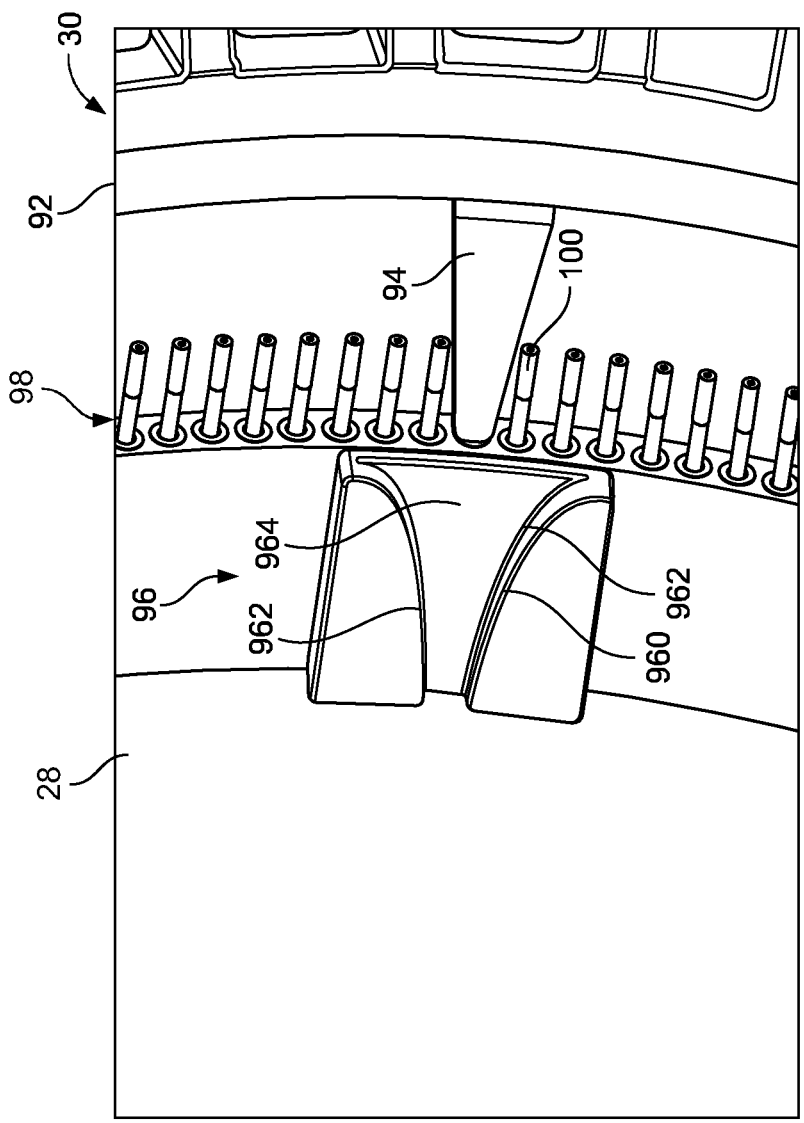
FIG. 15 is a schematic illustration of the rotor hub showing the blade attachment rods and receptacle

FIGS. 14 and 15 illustrate apparatus for guiding the blade 28 into a correct position for connection with the blade root bearing rim 92. In FIG. 14, the blade root bearing assembly is illustrated from the side, and can be seen to bear one or more guide rods or pins 94 on the rim 92. These are preferably made from a metallic material similar to the bearing rim 92, so that they are durable and will resist any compressive or shearing forces where they come into contact with the blade 28 as it approaches the hub 26.

As shown in FIG. 15, the guide rods 94 cooperate with a complementary socket-like section 96 provided on the root of the blade 28. For the purposes of the discussion here, the blade root can be thought of as a substantially cylindrical section having at a substantially circular terminating flange 98 for engaging the blade root bearing assembly on the hub 26. A plurality of metal bolts 100 extend from the flange 98 and must be secured to corresponding holes in the blade root bearing assembly. In some designs of wind turbine bearing, there can be 180 bolts to correctly align with a corresponding 180 holes in the bearing assembly, and with clearance of only say 3 mm between the bolt and the hole in which it is received. It will be appreciated that even a small discrepancy in alignment between the flange 98, the bolts 100 and the corresponding holes in the blade root bearing assembly, will prevent the blade 28 from engaging with the bearing assembly, and in the worst case, may result in damage to the bolts or the bearing assembly itself. The problem of alignment is aggravated by the weight of the blades, which in the example described here can be of the order of 30 tons or more. The guide rods 94 and the socket-like section 96 are therefore provided on the blade root and bearing assembly 30 so that when the guide rods 94 are received in the socket 96 the blade will be correctly aligned, avoiding damage, and saving time during assembly.

The socket like-section 96 is therefore located in the interior of the blade root adjacent the flange 98. In the example shown, the socket-like section 96 is a tapered groove 960, defined by shoulders 962, with a wider opening 964 for receiving the guide rod 94. As the distance between the flange 98 and the blade root bearing assembly 30 and the flange 98 draw closer together, the guide rod 94 can therefore first be positioned in the wider opening 964 with some tolerance. As the clearance between the flange 98 and the bearing assembly 30 is reduced the guide rod 94 engages the shoulders 962 and is moved towards the centre of the tapered groove 960 until is fully received between both shoulders 962. For this reason, the guide rod 94 also has a tapered shape to cooperate with the shoulders 962 and the tapered groove 960. The guide rods 94 and the socket-like section 96 therefore act together to rotate the blade 28 into the correct position for attachment against the blade bearing assembly 30.

Figure 16:
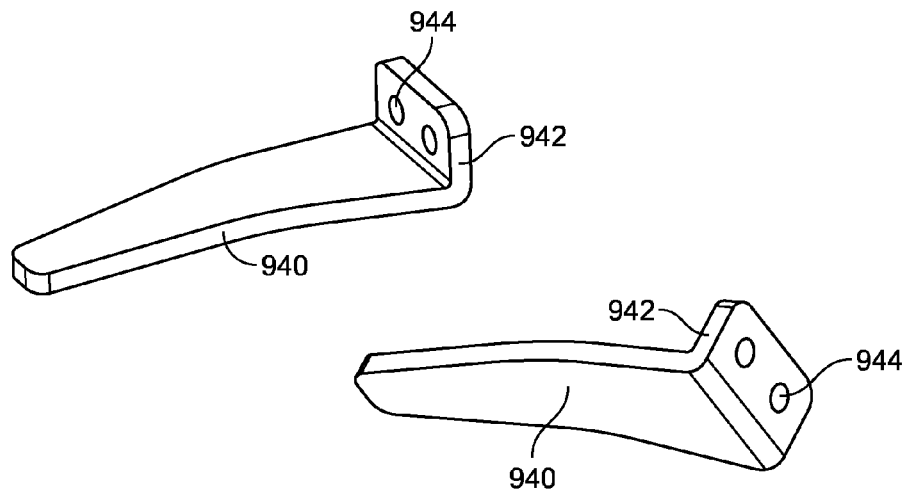
FIG. 16 is a close up view of the blade attachment guide rods shown in FIG. 14.
Figure 17:
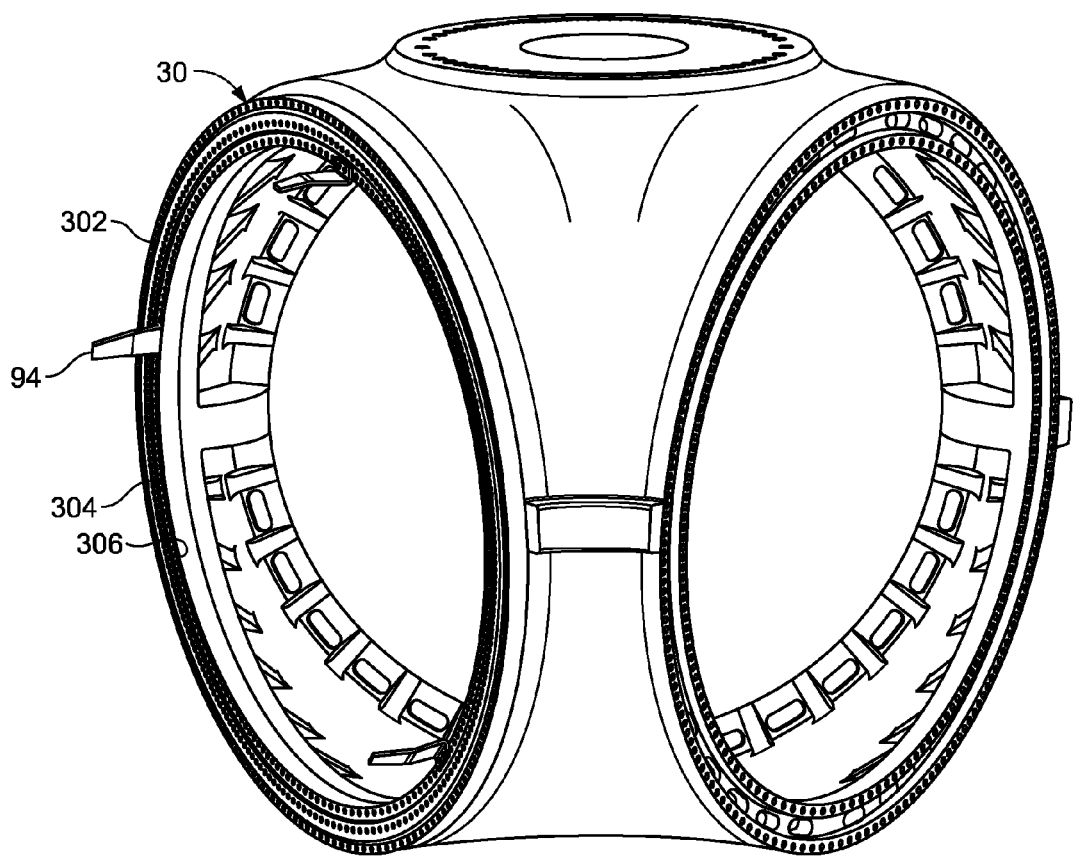
FIG. 17 is a schematic illustration of the rotor hub showing the blade attachment rods for a three ring bearing assembly.

The guide rods 94 are illustrated in more detail in FIGS. 16 and 17. FIG. 16 shows two views of the shape of the guide rods 94 in isolation. As can be seen in the diagram, the guide rods are essentially L-shaped having a connector portion 940, for engaging with the socket-like section 96, and a shorter flange section 942 for engaging with the blade root bearing assembly 30. The connector portion 940 is tapered but also has a slight bend intermediate its length (this can be seen more easily in a FIG. 14) which facilitates its connection with the socket-like section 96.

The connection of the guide rod 94 to the bearing assembly 30 is made using bolts or screws passing through holes 944 in flange section 942. FIG. 17 illustrates the blade root bearing assembly 30 and shows the attachment position for the guide rods 94. In this example, the blade root bearing assembly 30 comprises three separate bearing rings, an outer ring 302, an intermediate ring 304, and an inner ring 306. The bolts 100 of the blade root flange 98 are received in the holes of the intermediate ring 304. The guide rods 94 are therefore attached to the inner bearing ring 306 so that in use they sit inside and extend into the interior of the blade root flange 98. In use, the moveable intermediate ring 304 can be finely rotated to align the holes thereon with bolts 100. Alternatively, the movable intermediate ring 304 may be positioned against the inner or outer bearing so that the holes of the intermediate bearing 304 are in a known alignment with the guide rods on the fixed inner ring 306. Moving the blade root flange 98 into position so that the sockets 96 engage with the guide rods 94, ensures that the bolts 100 are also approximately positioned to engage with their respective holes. Bringing the sockets 96 and the guide rods 94 closer together then ensures, by the action of the guide rods 94 acting on the sockets 96 that the blade root flange 98 can adopt the correct rotational position for the bolts 100 to engage correctly with the holes.

In FIG. 17, although only three guide rods 94 are shown, in equal angular relationship to one another, it will be appreciated that a greater number of guide rods 94 could be used if desired, at equal spacing or otherwise.

Figure 21:
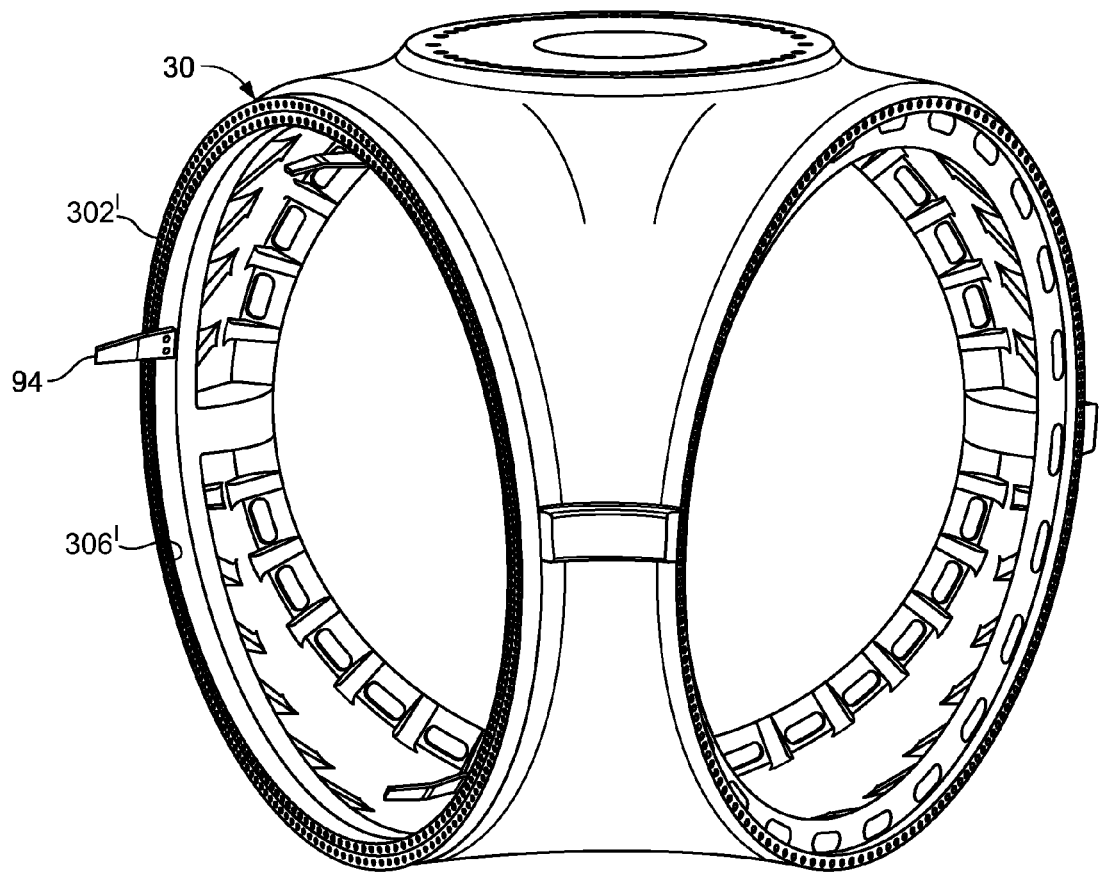
FIG. 21 is a schematic illustration of the rotor hub for a two ring bearing assembly.

FIG. 21 illustrates another embodiment of the attachment position for the guide rods 94. In this example, the blade root bearing assembly 30 comprises two separate bearing rings, an outer ring 302' which is attached onto the hub and an inner ring 306', which is rotatable relative to the outer ring 302' and holes of which receive the bolts 100 of the blade root flange 98. The guide rods 94 are attached to the inner ring 306' rotatable relative to the outer ring 302', and the positional relationship between the guide rods 94 and holes on the inner ring 306' and that between the socket like sections 96 and the bolts 100 are pre-defined in that alignment between the guide rods 94 and the socket like sections 96 will assure the alignment between the holes and bolts 100. When the guide rods 94 and the socket like-sections 96 receiving the guide rods 94 are not in exact alignment, the position of guide rods 94 and therefore the position of the holes on the inner ring can be finely tuned by rotating the inner ring 306' on which the guide rods are attached. In this example, the guide rods 94 are attached to the interior surface of the inner bearing 306' rather than via the attachment holes on the annular surface of the bearing ring. For this reason the guide rods 94 may have a flattened shape allowing holes 944 to be used to support fasteners that affix the rod 94 to the inner surface of the bearing ring, rather than the L-shape of FIG. 16. Alternately, if the inner ring is secured onto the hub and the outer ring is secured onto the blade, the guide rods 94 can be attached onto the outer ring to facilitate tuning of the position of guide rods 94. In this case, the guide rods 94 may be mounted externally to the bearing ring.

In FIG. 15, the socket-like section 96 is shown as an additional piece for attachment to the interior of the blade root. The socket-like section can then be manufactured from a suitable material, like metal, or hardened plastic, and secured in place with bolts or adhesive. This arrangement is advantageous as it becomes relatively straightforward to attach the socket in position. In alternative embodiments, however, the socket-like section 96 could be integral to the blade root, as if the groove 960 were to be engineered into the blade root itself. Further, while the tapered groove is preferred for ease of use, other shapes for the socket could be used, such as a simple hole, wall or peg arrangement to cooperate with the guide rod 94.

Figure 18:
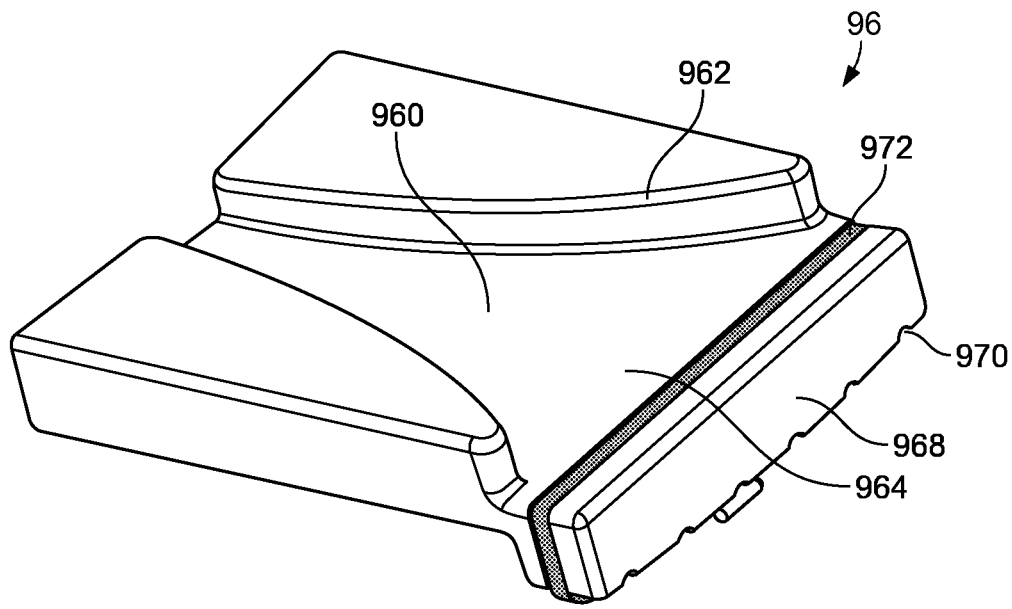
FIG. 18 is a close up view of the receptacle for the blade attachment guide rods shown in FIG. 17
Figure 19:
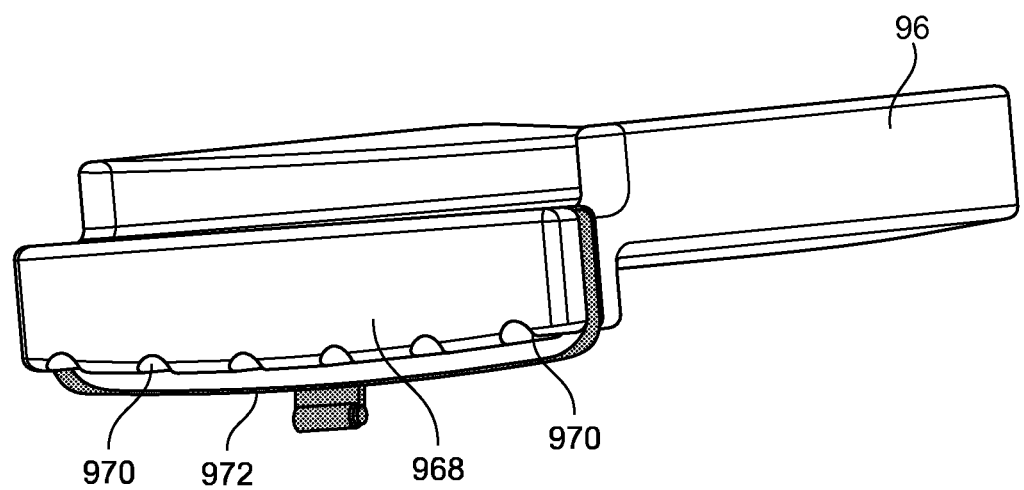
FIG. 19 is an alternative embodiment of the receptacle for the blade attachment guide rods.
Figure 20:
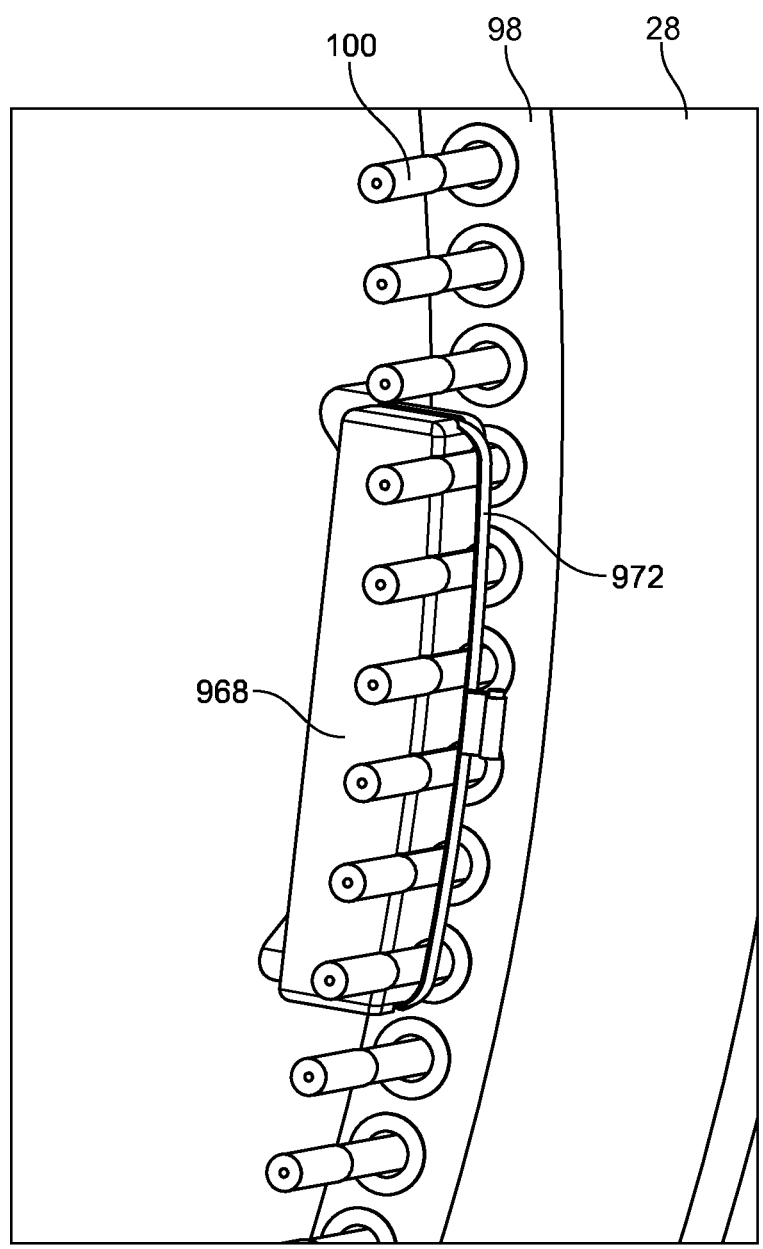
FIG. 20 is a schematic illustration of the receptacle in position.

An alternative example of the socket-like section 96 will now be described with reference to FIGS. 18 to 20. As shown in FIG. 18, the socket-like section 96 is provided with the tapered groove 960, shoulder 962 and opening 964 of FIG. 15. However, at the opening 964, the socket-like section is provided with a lip 968 that extends outwards from the opening. The width of the lip 968 is greater than the width of the rest of the socket-like section 96, and on the edge of the lip opposite the opening 964, a number of recesses 970 are provided. A tie or cable 972 is secured in place around the lip 968. These can be viewed more easily in FIG. 19.

In use, the socket 96 is held in place on the inside of the blade root by attaching the cable 972 around a number of the bolts 100 on the flange 98. In this arrangement, the lip 968 extends slightly outwards from the flange 98, while the greater width of the lip 968 means that the bolts 100 are received in the recesses 970. The tension of the cable 972 keeps the section 96 in place without the need for adhesive. In this way, when the bolts 100 are threaded into the holes in the blade root bearing assembly 30 and the blade flange 98 and the blade root bearing assembly 30 are brought together, the lip 968 will sit between the flange 98 and the bearing 30. The cable 972 can then be cut and the socket 96 detached into the inside of the blade root flange 98. A service engineer working in the hub 26 can then retrieve the socket 96 for later use.

In alternative examples, it is possible that the guide rods are located on the blade root flange 98, and the socket like section 96 is located on the blade root bearing 30. Further, the guide means described above in FIGS. 15, 16, 17 and 21 may be used with non-pitch adjusted blades, where the blade is mounted directly onto the hub without the use of a moveable bearing.

As noted above, the arrangement of blades against the tower as shown in FIG. 4 can be advantageously used during transport of the tower 22 to the offshore installation location. In particular, the ability to store blades against the tower or transport greatly simplifies installation. The tower can be assembled on land, at a site such as a dry dock for example, and the three wind turbine blades 28 attached to the tower by means of the respective support arms 52 and 54. This greatly reduces the need for large crane operations, as the tower and blades can be assembled horizontally and the combined unit of the tower and blades subsequently lifted into a vertical position using an onshore crane. Ordinarily, four separate lifting operations would be required for this operation, one for the tower and subsequent lifting operation for each blade. The nacelle can finally be attached to the tower using a subsequent lifting operation, and the semi-assembled tower then transported by a ship or barge to an installation. During installation, the wind turbine blades can be lifted into place using the winch 82 or on-tower crane of the wind turbine, or using an on-ship crane.

The support arms can be retained on the tower exterior for use in any later servicing or maintenance operations, to usefully secure the wind turbine blades against the tower 22, when the wind turbine blades are required to be detached from the rotor hub. Strictly, only one set of support arms for supporting one wind turbine blade during maintenance needs to be retained on the tower, allowing the other two sets of support arms to be removed if desired.

Although examples of the invention have been described involving offshore horizontal axis wind turbines, it will be appreciated that the invention could be used with land-based wind turbines, or with vertical axis wind turbines where appropriate. Although, a particular type of blade root bearing assembly has been described above in connection with this apparatus, the invention is not limited to this type of assembly. Other assemblies will be apparent to the skilled person.

Further, although the invention has been illustrated by a number of separate examples, it will be appreciated that features of the separate examples could be used in combination.

The invention claimed is:

1. A blade connection apparatus for connecting a wind turbine blade to a wind turbine rotor hub, comprising:
   a first and second engagement surface, wherein the first engagement surface is located at the root of the wind turbine blade and the second engagement surface is located on the wind turbine rotor hub for engaging with the first engagement surface;
   a plurality of fasteners for releasably and securely connecting the first engagement surface to the second, the fasteners comprising a male part provided on one of the engagement surfaces for connection with a corresponding female part provided on the other engagement surface;
   first and second guide members located on the wind turbine blade and the rotor hub respectively and arranged to cooperate as they are brought into contact with each other,
   wherein when the first and second engagement surfaces are brought towards one another for connection, the first and second guide members engage one another in advance of contact between the first and second engagement surfaces to adjust the angular relative positioning of the first and second engagement surfaces and ensure that the male and female parts of the fasteners are aligned for connection.

2. The connection apparatus of claim 1, wherein the first and second engagement surfaces are substantially circular flanges having a circumference around which at discrete locations the plurality of fasteners are provided, and wherein the cooperation between the first and second guide members as the first and second engagement surfaces are brought towards one another causes the circular flanges to undergo coaxial rotation with respect to one another so that the fasteners are properly aligned.

3. The connection apparatus of claim 1, wherein the first guide member is elongate in shape and extends from either one of the wind turbine blade or rotor hub towards the second guide member by an amount that is greater than the length of the male part of the fasteners.

4. The connection apparatus of claim 3, wherein the first guide member is a pin secured to the rotor hub at a blade root bearing.

5. The connection apparatus of claim 4, wherein the first guide member is tapered.

6. The connection apparatus of claim 3, wherein one or the other of the rotor hub or the blade has at least an outer blade root bearing ring and an inner blade root bearing ring, and the first guide member is secured to the inner blade root bearing, and angled to extend towards the second guide member while remaining inside the circumference defined by the inner blade root bearing ring.

7. The connection apparatus of claim 3, wherein the rotor hub has a fixed blade root bearing ring secured thereon and a rotatable blade root bearing ring which is rotatable relative to the fixed blade root bearing ring, and the first guide member is secured to the rotatable blade root bearing ring.

8. The connection apparatus of claim 3, wherein the second guide member provides a recess for receiving the first guide member.

9. The connection apparatus of claim 8, wherein the recess comprises:
an opening for receiving the first guide member in a partially inserted position; and
tapered shoulders for supporting the first guide member in a fully inserted position.

10. The connection apparatus of claim 9, wherein the tapered shoulders are curved to encourage the first guide member to take up a position in a centre of the recess.

11. The connection apparatus of claim 8, wherein the recess is provided in a guide member housing, the housing comprising:
a lip portion for cooperating with the male fasteners on the first or second engagement surface;
a cord for securing the lip portion and housing to the male part of the fasteners to hold the housing in place.

12. The connection apparatus of claim 1, wherein the second guide member is located inside the circular flange of the blade root, or inside a circular flange of the blade connection portion on the hub.

13. The connection apparatus of claim 1, comprising at least three first and second guide member pairs.

14. A wind turbine blade and rotor hub connection guide system, comprising:
first and second guide members for mounting on respective ones of a wind turbine blade or rotor hub, to facilitate connection of the wind turbine blade to the hub by fasteners having male and female fastener portions;
wherein the first guide member has an elongate shape;
wherein the second guide member provides a recess with an opening for receiving the first guide member in a partially inserted position, and a recess profile for supporting the first guide member in a fully inserted portion; and
wherein the recess profile encourages the first guide member towards a position in the recess in order to adjust the angular relative positioning of the wind turbine blade and rotor hub such that the wind turbine blade is correctly aligned for the attachment of the male fastener portions with the female fastener portions.

15. The connection guide system of claim 14, wherein the recess profile comprises tapering sides having curved surfaces which encourage the first guide member toward a centre of the recess as the first and second guide members are brought into engagement with one another.

16. The connection guide system of claim 14, wherein the first guide member has a length that is greater than that of the male part of the fasteners.

17. The connection guide system of claim 14, wherein the first guide member has a connection portion for attachment to the rotor hub at a blade root bearing.

18. The connection guide system of claim 14, wherein one or the other of the blade or rotor hub has at least an outer blade root bearing ring and an inner blade root bearing ring, and the first guide member is angled so that when attached to the inner blade root bearing, it extends towards the second guide member while remaining inside the circumference defined by the inner blade root bearing ring.

19. The connection guide system of claim 14, wherein the rotor hub has a fixed blade root bearing ring secured thereon and a rotatable blade root bearing ring which is rotatable relative to the fixed blade root bearing ring, and the first guide member is secured to the rotatable blade root bearing ring.

20. The connection guide system of claim 14, wherein the first guide member is tapered.

21. The connection guide system of claim 14, wherein the recess profile comprises tapering shoulders curved to encourage the first guide member to take up a position substantially in the centre of the recess.

22. The connection guide system of claim 14, wherein the recess is provided in a guide member housing, the housing comprising:
a lip portion for cooperating with the male fasteners on the first or second engagement surface;
a cord for securing the lip portion and housing to the male part of the fasteners to and hold the housing in place.

23. A method of mounting a wind turbine blade on a wind turbine rotor hub, comprising:
attaching a first guide member to the wind turbine blade, and a second guide member to the rotor hub;
roughly aligning the first and second guide members with one another while engagement surfaces on the blade and hub are separated from one another;
moving the blade towards the hub to decrease the separation between the blade and hub and to engage the first guide member with the second;
decreasing the separation further until the blade and hub are in contact with one another; and
fastening the blade and hub securely to one another using a plurality of fasteners having male and female fastener parts;
wherein the first and second guide members are arranged to cooperate as the engagement surfaces located on the blade and hub are brought into contact with each other and before the fasteners for connecting the engagement surfaces are engaged to adjust the angular relative positioning of the engagement surfaces and align the male and female fastener parts.

24. The method of claim 23, comprising:

attaching the first guide member to the blade root bearing section of the rotor hub; and attaching the second guide member to the root section of the wind turbine blade.

25. The method of claim 23, wherein the second guide member comprises a cord for securing the guide member to the male parts of the fasteners, and wherein the method comprises:

using the cord, attaching the second guide member to the male part of the fasteners while the blade and hub engagement surfaces are separated;

moving the blade towards the hub to decrease the separation between the blade and hub and to engage the first guide member with the second, until the second guide member is sandwiched between the engagement surfaces of the blade and hub, and the fasteners are aligned; and removing the cord and releasing the second guide member.

\* \* \* \* \*